(12) United States Patent
Tanna et al.

(10) Patent No.: US 9,189,760 B2
(45) Date of Patent: Nov. 17, 2015

(54) SYSTEM, METHOD AND COMPUTER READABLE MEDIUM FOR USING PERFORMANCE INDICATORS AND PREDICTIVE ANALYSIS FOR SETTING MANUFACTURING EQUIPMENT PARAMETERS

(71) Applicants: Jemin Tanna, Bangalore (IN); Jiten Kumar Mohnani, Bangalore (IN)

(72) Inventors: Jemin Tanna, Bangalore (IN); Jiten Kumar Mohnani, Bangalore (IN)

(73) Assignee: SAP SE, Walldorf, DE (US)

( * ) Notice: Subject to any disclaimer, the term of this patent is extended or adjusted under 35 U.S.C. 154(b) by 423 days.

(21) Appl. No.: 13/680,602

(22) Filed: Nov. 19, 2012

(65) Prior Publication Data

US 2014/0142737 A1    May 22, 2014

(51) Int. Cl.
*G06F 19/00*        (2011.01)
*G06F 7/00*         (2006.01)
*G06F 15/16*        (2006.01)
*G06F 21/00*        (2013.01)
*G06F 13/00*        (2006.01)
*G06F 17/30*        (2006.01)
*G06F 12/00*        (2006.01)
*G06Q 50/00*        (2012.01)
*G06Q 10/00*        (2012.01)
*G06Q 30/00*        (2012.01)
*H04N 7/10*         (2006.01)
*H04N 7/173*        (2011.01)
*G06F 13/28*        (2006.01)
*G06Q 10/06*        (2012.01)
*G06Q 10/04*        (2012.01)
*G06Q 50/04*        (2012.01)

(52) U.S. Cl.
CPC ............. *G06Q 10/06* (2013.01); *G06Q 10/04* (2013.01); *G06Q 10/06375* (2013.01); *G06Q 50/04* (2013.01)

(58) Field of Classification Search
CPC .......... B05C 5/02; G06F 17/22; G06F 15/16; G06Q 10/06; G06Q 40/00; G06Q 40/40; H04N 7/10
USPC ........................................................... 707/10
See application file for complete search history.

(56) References Cited

U.S. PATENT DOCUMENTS

2005/0278492 A1*  12/2005  Stakutis et al. ............... 711/161
2007/0050070 A1*   3/2007  Strain et al. ..................... 700/99
2007/0174290 A1    7/2007  Narang et al.
2010/0332404 A1*  12/2010  Valin ............................. 705/310
2011/0218667 A1    9/2011  Weigmann et al.
2013/0138672 A1*   5/2013  Wasserman .................. 707/758
2014/0257545 A1    9/2014  Tanna et al.

FOREIGN PATENT DOCUMENTS

EP            1591170 A2    11/2005

OTHER PUBLICATIONS

European Communication pursuant to Article 94(3) EPC for EP Application No. 13004580.0, mailed Feb. 24, 2015, 5 pages.

* cited by examiner

*Primary Examiner* — Mohammad Ali
*Assistant Examiner* — Md Azad
(74) *Attorney, Agent, or Firm* — Brake Hughes Bellermann LLP

(57) ABSTRACT

The method includes receiving first data from an in-memory computing module, the data including performance indicators, receiving second data from a enterprise resource planning database, predicting a target time per piece based on the first data and the second data, predicting a target cost per piece based on the first data and the second data, and setting an equipment speed based on the target time per piece and/or the target cost per piece.

17 Claims, 6 Drawing Sheets

SYSTEM, METHOD AND COMPUTER READABLE MEDIUM FOR USING PERFORMANCE INDICATORS AND PREDICTIVE ANALYSIS FOR SETTING MANUFACTURING EQUIPMENT PARAMETERS

BACKGROUND

1. Field

Embodiments relate to systems and methods for utilizing performance indicators and predictive analysis for setting manufacturing equipment parameters.

2. Related Art

Large quantities of data are typically collected in many types of manufacturing environments. For example, data is collected (e.g., in an enterprise resource planning (ERP)) system regarding product quality and costs. However, due to the nature of this data (e.g., quantity) systems have not been able to efficiently leverage this data in order to optimally set manufacturing equipment parameters in real-time manufacturing environments.

SUMMARY

One embodiment includes a method for setting an equipment speed. The method includes receiving first data from an in-memory computing module, the data including performance indicators, receiving second data from a enterprise resource planning database, predicting a target time per piece based on the first data and the second data, and setting an equipment speed based on the target time per piece. The predicted target time per piece may be a minimum acceptable time derived from the setting of the new equipment speed.

Another embodiment includes a method for setting an equipment speed. The method includes receiving first data from an in-memory computing module, the data including performance indicators, receiving second data from a enterprise resource planning database, predicting a target cost per piece based on the first data and the second data, and setting an equipment speed based on the target cost per piece. The predicted target cost per piece may be a minimum acceptable cost derived from the setting of the new equipment speed.

Still another embodiment includes a method for setting an equipment speed. The method includes receiving first data from an in-memory computing module, the data including performance indicators, receiving second data from a enterprise resource planning database, predicting a target time per piece based on the first data and the second data, predicting a target cost per piece based on the first data and the second data, and setting an equipment speed based on the target time per piece and the target cost per piece. The predicted target cost per piece may be a minimum acceptable cost derived from the setting of the new equipment speed. The predicted target time per piece may be a minimum acceptable time derived from the setting of the new equipment speed.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1:
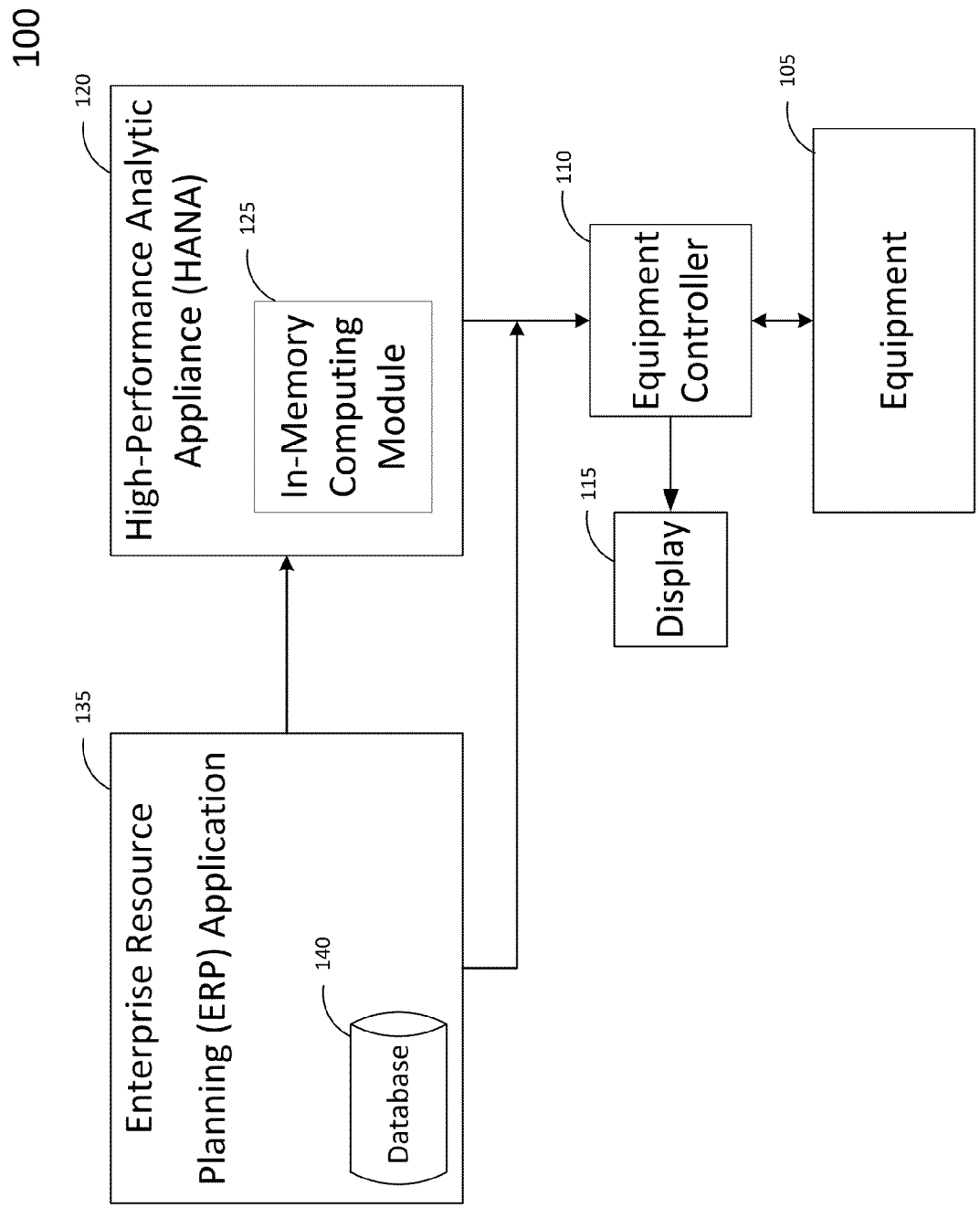
FIG. 1 illustrates a system for using performance indicators and predictive analysis for setting manufacturing equipment parameters according to an example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

FIG. 1 illustrates a system for using performance indicators and predictive analysis for setting manufacturing equipment parameters according to an example embodiment. As shown in FIG. 1, the system 100 includes an equipment 105, an equipment controller 110 a display 115, a high-performance analytic appliance (HANA) 120, and an enterprise resource planning (ERP) application 135. The HANA 120 may have an associated in-memory computing module 125 and the ERP application 135 may have an associated database 140.

For example, the equipment 105 may be manufacturing equipment (e.g., a lathe, a robot, a computer numerical control (CNC) machine, baking equipment and the like). The equipment controller 110 may provide all necessary control instructions for operating the equipment 105. For example the equipment controller may include memory, a processor, a bus, switches, interfaces and other circuits and devices (not shown) to control the operation of the equipment 105. Display 115 may be, for example, a LCD display configured to provide a user interface with an operator of the equipment 105.

Database 105 may be configured to store information about the operation of the equipment 105. For example, database 105 may store real-time and historical information about the equipment 105. The real-time and historical information may include, but is not limited to, operating speed, pieces per hour, quality statistics, temperatures, up-times, down-times and maintenance information (e.g., time to next service, component runtimes and the like).

The HANA 120 (e.g., SAP™ HANA) may be a data warehouse appliance for processing high volumes of operational and transactional data in real-time. HANA may use in-memory analytics, an approach that queries data stored in random access memory (RAM) instead of on hard disk or flash storage.

The HANA 120 may use a replication server (e.g., SAP Sybase replication server) to copy and synchronize data from a data warehouse (e.g., HANA 120 being in the form of an in-memory database) or enterprise resource planning (ERP) application (e.g., ERP application 135) in real-time. By running in parallel to the source ERP application and/or data warehouse, the HANA 120 may be configured to allow users to query large volumes of data in real-time without having to wait for scheduled reports to run. The HANA 120 may be configured to support known standards such as structured query language (SQL). The HANA 120 may include a programming component (not shown) configured to allow creation (and editing) of and run customized applications on top of the HANA 120.

The enterprise resource planning (ERP) application 135 may be an integration of business management practices and information technology (IT) architecture (e.g., computer hardware and software). The IT architecture may integrate core business processes to streamline and accomplish specific business objectives. For example, the ERP application 135 may be configured to provide an amalgamation of business management practices, IT, and business objectives.

For example, the ERP application 135 may be configured to manage a centralize data repository (e.g., database 140) configured to acquire information from and supply information to fragmented applications operating on a universal computing platform. The ERP application 135 may be configured to envelop a broad range of enterprise functions and integrate the functions into a single unified database repository (e.g., database 140). For example, functions such as human resources, supply chain management, customer relationship management, finance, manufacturing warehouse management, quality assurance, and logistics may be included in the ERP application 135.

The in-memory computing module 125 and the ERP application 135 may be configured to provide data to the equipment controller. The equipment controller may use the provided data to predict a target time per piece and/or a target cost per piece. The target time per piece and/or the target cost per piece may be a minimum time per piece and/or a minimum cost per piece respectively. The target time per piece and/or the target cost per piece may be used to determine and set a speed of the equipment 105. The target time/cost per piece may be a minimum acceptable time/cost derived from the setting of the new equipment speed.

Figure 2:
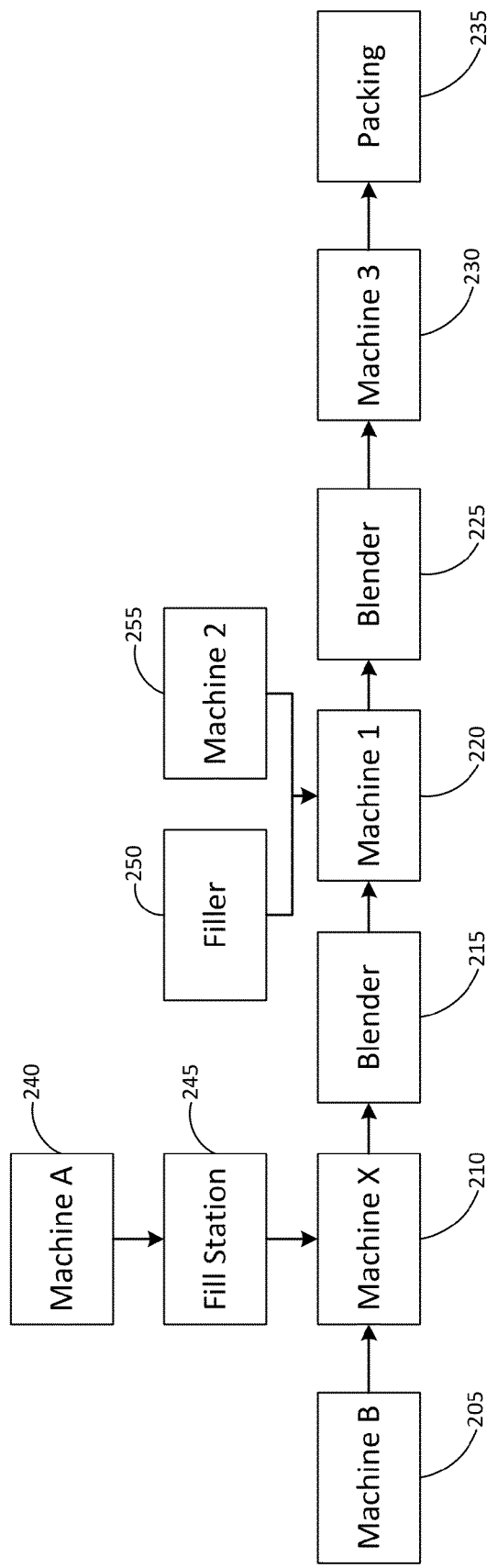
FIG. 2 illustrates a manufacturing system using the system of FIG. 1 according to an example embodiment.

FIG. 2 illustrates a manufacturing system using the system of FIG. 1 according to an example embodiment. As shown in FIG. 2, manufacturing system 200 includes a plurality of manufacturing machines, stations and/or equipment 205-245. One or more of the manufacturing machines, stations and/or equipment 205-245 may include equipment 105 described above. Manufacturing system 200 is an exemplary system and is not intended to limit the example embodiments describe herein in any way. For example, manufacturing system 200 may include more or less manufacturing machines, stations and/or equipment than shown in FIG. 2.

The manufacturing system 200 may be configured to produce a product. The product may be any manufactured product according to example embodiments. The operation of the plurality of manufacturing machines, stations and/or equipment 205-245 is not essential to the understanding of example embodiments and will not be described in detail for the sake of brevity. One of more example embodiments are directed to the interaction of plurality of manufacturing machines, stations and/or equipment 205-245. For example, if machine B 205 is offline (e.g., having maintenance performed), equipment parameters (e.g., machine speed) associated with machine A 240 may be changed (e.g., increased) in order to account the loss of machine B 205.

However, changing equipment parameters (e.g., machine speed) associated with a manufacturing machine (e.g., machine A 240) may impact the manufacturing machine and/or other machines in the manufacturing system 200 in a detrimental way. For example, increasing the speed of machine A 240 may result in machine A 240 running out of raw material, excessively wear tooling, lead to more frequent routine maintenance, and the like. Although the increase in speed may be intended to lower the time per piece and/or lower the cost per piece, the aforementioned side effects may result in an increase in the time per piece and/or an increase in the cost per piece.

Figure 3:
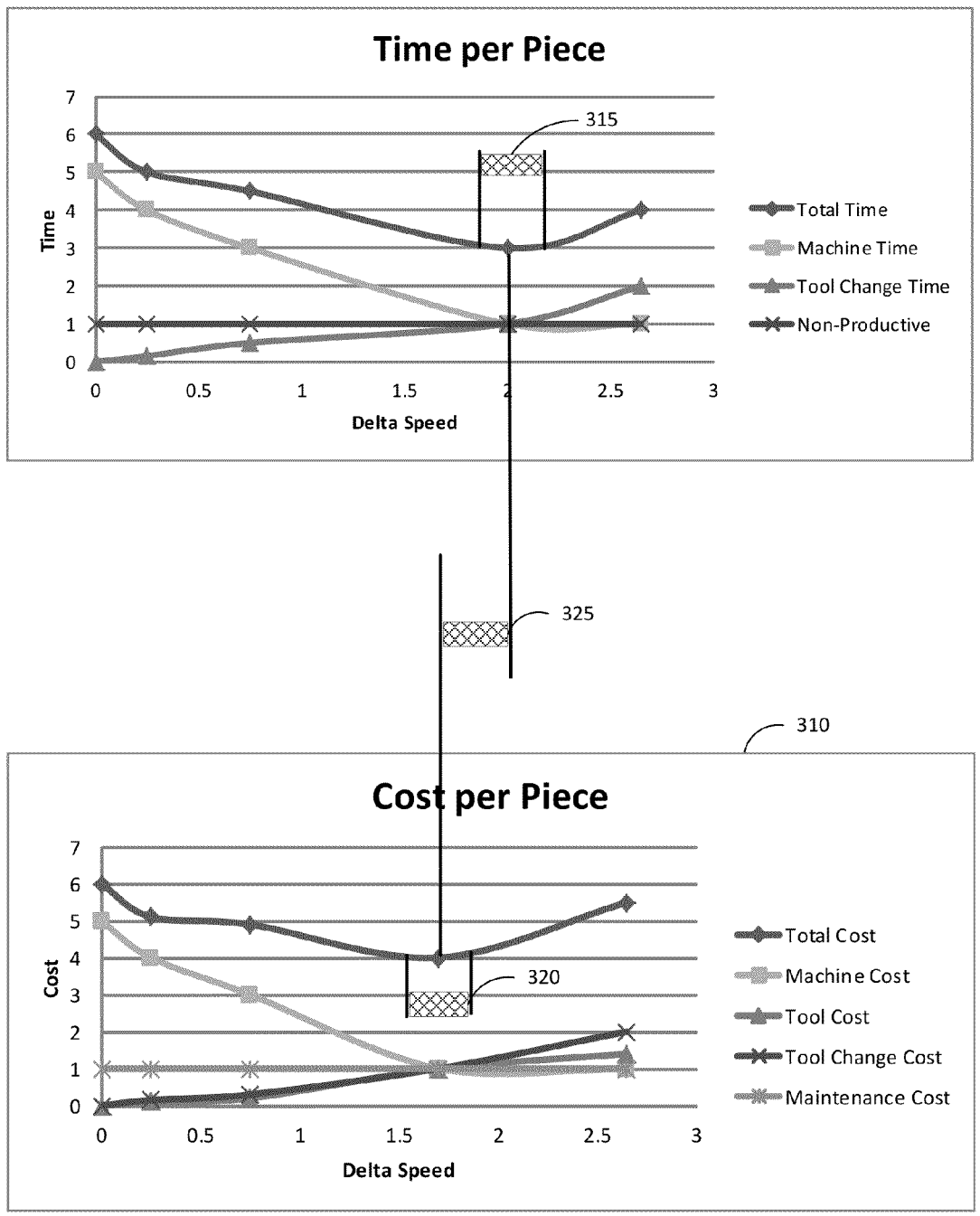
FIG. 3 illustrates graphs indicating time per piece and cost per piece according to an example embodiment.

FIG. 3 illustrates graphs indicating time per piece and cost per piece according to an example embodiment. As shown in FIG. 3, total time per piece and total cost per piece are grafted in relation to speed and displayed in comparison to other times and costs.

As one skilled in the art will appreciate normal, even maximum, operating parameters may not be true normal or maximums for equipment. For example, a manufacturer of equipment may specify a maximum operating speed for the manufacturing equipment (e.g., machine A 240). The manufacturer of the equipment may include a conservative margin so as to allow for variability across many equipment of the same type. However, the user of the equipment may collect data associated with the manufacturing equipment (e.g., machine A 240) which suggests the manufacturing equipment may be operated at a higher speed, for example.

Graph 305 illustrates time per piece. As is shown, as speed is increased, time per piece decreases. However, a minimum time is achieved (at approximately a delta of 2) after which time per piece increases. In graph 305, this increase in time per piece may be attributed to an increase in tool change time. However, example embodiments are not limited to tool change time. According to an example embodiment, the operating speed should be set at a target time per piece around a delta of two (e.g., an increase of two percent) as is illustrated by target box 315. The target time per piece may be a minimum acceptable time derived from the setting of the new equipment speed.

Graph 310 illustrates cost per piece. As is shown, as speed is increased, cost per piece decreases. However, a minimum time is achieved (at approximately a delta of 1.75) after which cost per piece increases. In graph 310, this increase in cost per piece may be attributed to an increase in tool change cost. However, example embodiments are not limited to tool change cost. According to example embodiments, the operating speed should be set at a target time per piece around a delta of 1.75 (e.g., an increase of 1.75 percent) as is illustrated by target box 320. The cost per piece may be a minimum acceptable time derived from the setting of the new equipment speed.

According to an example embodiment, time per piece and cost per piece may be considered together. Target box 325 illustrates a target time per piece based on a minimum time per piece and a minimum cost per piece.

Increasing machine speed, for example, in discrete industries may have a direct correlation with cost per piece and time per piece. For example in a discrete industry a plant may have ten (10) Lathe machine and ten (10) drilling machines. At a given point in time there has to be a decision taken to change the speeds of these machines in order to, for example, decrease time per piece or decrease cost per piece as shown in FIG. 3.

In machine speed economics is affected by may variables. For example, these variable may include machining cost (e.g., labor cost machine overhead and time to machine), idle time (e.g., cost of setting up machine cost of loading, unloading tools and work piece), tooling cost (e.g., cost of tool, cost of regrinding tool, cost of tool regrinding machine), and maintenance cost (e.g., cost of maintenance activities (constant for time based and variable for frequency based)) to name a few.

As shown in FIG. 3, a number of factors get involved in defining the time and cost per piece in a given time window. The acceptable speed range may be derived from a dataset registered over period of time and may be subject to changes based on machine aging, equipment aging, and process changes.

With regard to manufacturing equipment or processes, process indicators (e.g., cost per piece and time per piece) may be indicative of overall equipment effectiveness (OEE). OEE quantifies how well a manufacturing unit performs relative to its designed capacity, during the periods when it is scheduled to run. For example, OEE may quantify availability, performance and quality. As is known, availability represents the percentage of scheduled time that the operation is available to operate. Often referred to as Uptime. As is known, performance represents the speed at which the machine or process runs as a percentage of its designed speed. As is known, quality represents the good units produced as a percentage of the total units started.

Example embodiments relate to OEE as evaluated using HANA (e.g., HANA 120). Example embodiments may provide real-time OEE by capturing and calculating performance, quality and availability performance indicators of a machine. This calculation may enable abstraction at higher organization levels as well as deep drill downs to machine level. With OEE as starting point example embodiments may enable assisting decision about corrective mechanism across various performance indicators by helping predictive analytics on the outcome of the corrective step with respect to time and cost. Comparing various possible corrective steps to achieve a goal can help surfacing of more efficient (thus more profitable) alternatives which were previously not identifiable because of the complexity (e.g., vast amounts of data) of the solution. Example embodiments use predictive analytics for assisting decision making by comparing projected cost and time factors to achieve plant goals of OEE by, for example, increasing machine speed and/or increasing machine production quality.

Enterprise resource planning (ERP) is an industry term for the broad set of activities that helps a business manage the important parts of its business. The information made available through an ERP system provides visibility for performance indicators required for meeting corporate objectives. ERP software applications can be used to manage product planning, parts purchasing, inventories, interacting with suppliers, providing customer service, tracking orders, and tracking product quality. Typically, an ERP system uses or is integrated with a relational database system. Example embodiments may use ERP data in the aforementioned predictive analytics.

When increasing a machine speed and through-put, quality may be a factor to consider as one of the performance indicators. For example, if keeping a same quality cost for increased speeds/throughputs, the quality may decrease. There may be two segments of quality to consider. The first segment may be cost of failure to control quality including internal failure costs (e.g., scrap, rework, spoilage, and the like) and external failure (e.g., warranty cost, field servicing, and the like). The second segment may be cost to controlling quality (e.g., prevention cost and appraisal cost).

At least one example embodiment may include a method. The method including receiving first data from an in-memory computing module, the data including performance indicators, receiving second data from a enterprise resource planning database, predicting a target time per piece based on the first data and the second data, predicting a target cost per piece based on the first data and the second data, and setting an equipment speed based on the target time per piece and/or the target cost per piece.

Figure 4:
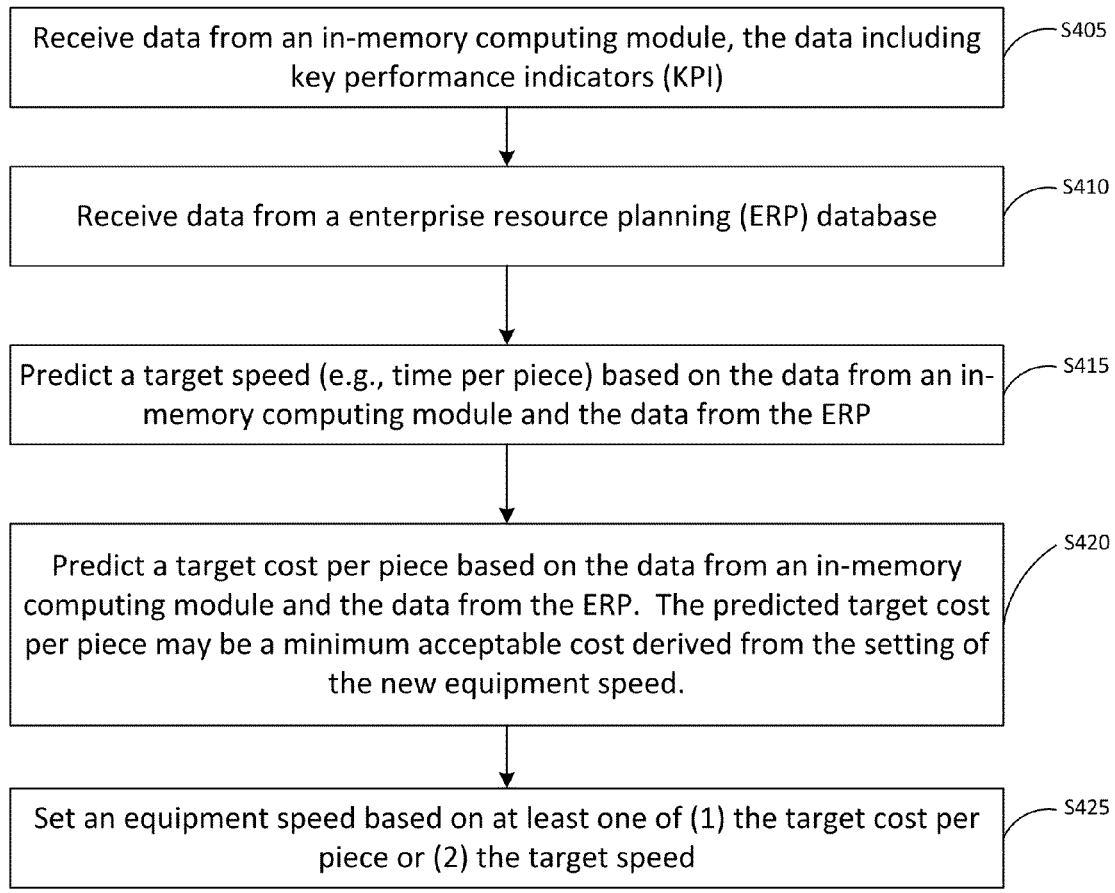
FIG. 4 illustrates a method for setting equipment speed according to at least one example embodiment.

FIG. 4 illustrates a method for setting equipment speed according to at least one example embodiment. While describing the steps of FIG. 4, reference will be made to the equipment controller 110 as performing each of the steps. However, example embodiments are not limited thereto. For example, one or more of the steps may be performed by HANA 120. As one skilled in the art will appreciate, the method steps described with regard to FIG. 4 may be software code stored in a memory associated with equipment controller 110 and executed by a processor associated with equipment controller 110. However, alternative embodiments are contemplated. For example, the method steps may be performed by an application-specific integrated circuit, or ASIC.

As shown in FIG. 4, in step S405 the equipment controller 110 receives data from an in-memory computing module, the data including performance indicators. For example, the in-memory computing module 125 may load a plurality of performance indicators in local memory. The performance indicators may be associated with the equipment (e.g., machine A 240) associated with the equipment controller 110, two or more pieces of equipment (e.g., machine A 240 and machine 1 220) and/or an entire production line (e.g., manufacturing system 200).

The in-memory computing module 125 may determine summarized performance indicator values based on the loaded performance indicator. For example, the in-memory computing module 125 may determine a minimum, a maximum, an average, a statistically significant range, and the like for each loaded performance indicator. For example, the in-memory computing module 125 may determine performance indicator values (e.g., time and cost performance indicator values) versus machine parameters (e.g., machine speed). For example, the in-memory computing module 125 may determine machine up-time versus speed, tool change time versus speed, machine down-time (non-productive time) versus speed. For example, the in-memory computing module 125 may determine machine cost versus speed, tool change cost versus speed, machine maintenance costs versus speed.

The in-memory computing module 125 may send the summarized performance indicator values to the equipment controller 110 which, in-turn, receives the summarized performance indicator values. Alternatively (or in addition to), the in-memory computing module 125 may send the summarized performance indicator values to another module (not-shown) within the HANA 120.

In step S410 the equipment controller 110 receives data from an enterprise resource planning (ERP) database. ERP is discussed in more detail above. The data may include product planning information (e.g., bill-of-material, machine maintenance planning, process time measurements (e.g., tooling change times), and the like) inventory information (e.g., raw material on hand) and quality information (e.g., customer returns). The data may be associated with machine parameters (e.g., machine speed). For example, the data may be received via the in-memory computing module 125 following computations of the ERP data versus the machine parameter. Alternatively (or in addition to), the in-memory computing module 125 may receive the data, make calculations and send the results to another module (not-shown) within the HANA 120.

In step S415 the equipment controller 110 predicts a target time per piece based on the data from an in-memory computing module and the data from the ERP. For example, as shown in FIG. 3 and graph 305, the equipment controller 110 may predict a target time per piece based on a minimum range of a total time value based on the summarized performance indicator values and the ERP data. For example, as discussed above with regard to FIG. 3 the machine may be able to run at a faster speed than rated. The faster speed may be determined based on one or more performance indicator and is shown as machine time. For example, as discussed above with regard to FIG. 3 the machine may require tooling changes. The tooling change time may be determined based on ERP data and is shown as tool change time. Note that as machine speed is increased at some speed more tooling changes may be required resulting in an increase in time. The total time may be determined based on, for example, the machine time and the tooling change time.

In step S420 the equipment controller 110 predicts a target cost per piece based on the data from an in-memory computing module and the data from the ERP. For example, as shown in FIG. 3 and graph 310, the equipment controller 110 may predict a target cost per piece based on a minimum range of a total cost value based on the summarized performance indicator values and the ERP data. The predicted target cost per piece may be a minimum acceptable cost derived from the setting of the new equipment speed. For example, as discussed above with regard to FIG. 3 the machine may be able to run at a faster speed than rated. The faster speed may be determined based on one or more performance indicator and is shown as machine cost. For example, as discussed above with regard to FIG. 3 the machine may require tooling changes. The tooling change cost may be determined based on ERP data and is shown as tooling change cost. Note that as machine speed is increased at some speed more tooling changes may be required resulting in an increase in cost. The total cost may be determined based on, for example, the machine cost and the tooling change cost.

In step S425 the equipment controller 110 sets an equipment speed based on at least one of (1) the target cost per piece or (2) the target time per piece. For example, the equipment speed may be set to be within the target time per piece based on a minimum range of a total time value as discussed above. For example, the equipment speed may be set to be within the target time per piece based on a minimum range of a total cost value as discussed above. For example, the equipment speed may be set to be within a target time per piece based on a range between minimum value of a total time value and a minimum of a total cost value as shown in FIG. 3 as target block 325.

The steps of the method of FIG. 4 may be repeated on a regular basis. For example, the performance indicator values and the ERP data may change regularly in real time. As a result one of the target time per pieces may preferably be updated. For example, in the situation where the performance indicator values and the ERP data are based on a single manufacturing machine, ERP data such as raw material may change (e.g., depletion, reassignment or receipt of new material. In this case, the single manufacturing machine minimum total time may decrease if raw material is depleted or reassigned and the single manufacturing machine minimum total time may increase if new raw material is received. As a result, the speed of the single manufacturing machine may be changed in real time using the method of FIG. 4.

Performance indicators may include real-time performance indicators associated with other equipment in a manufacturing process utilizing the equipment. The ERP data may include real-time information including at least one of bill of material information, machine set-up information, tool information, and maintenance information associated with other equipment in a manufacturing process utilizing the equipment Predicting the target cost per piece or the target time per piece may include predicting a cost such that a cost associated with the manufacturing process such that the time and/or cost associated with the manufacturing process is minimized based on the real-time performance indicator and the real-time information.

For example, in the situation where the performance indicator values and the ERP data are based on a manufacturing process (e.g., manufacturing system 200), the performance indicator values and the ERP data may vary based on other machines in the manufacturing process (e.g., machine B 205). For example, if machine B 205 is shut down for maintenance, machine A 240 may be configured to fill the void left by machine B 205. Therefore, raw material may be reassigned to machine A 240 and the steps of FIG. 4 may result in an increased speed being set on machine A 240. In addition, the operator of machine A 240 may be able to monitor other equipment in the process (even if the equipment is remote to the operator) on, for example, display 115.

For example, fill station 245 may not be configured to receive the additional product from machine A 240 over an extended period of time for any number of reasons. Therefore, the operator of machine A 240 may be informed in real-time that fill station 245 is reaching a limit on some performance indicator value and adjust the speed of machine A 240 accordingly. As a further example, machine B 205 may come back on-line unexpectedly early. The operator of machine A 240 may see an indication of this on the display and adjust the speed of machine A 240 accordingly. For example, the operator of machine A 240 may see an indication of one or more performance indicator values for machine B 205 increase. For example, the operator of machine A 240 may see an indication of one or more performance indicator values for machine X 210 increase and then decrease as machine X 210 is overloaded upstream. As a result, the speed of the any manufacturing machine in the manufacturing process may be changed in real-time using the method of FIG. 4 and based on performance indicator values or ERP data from another machine or process in the manufacturing process.

Figure 5:
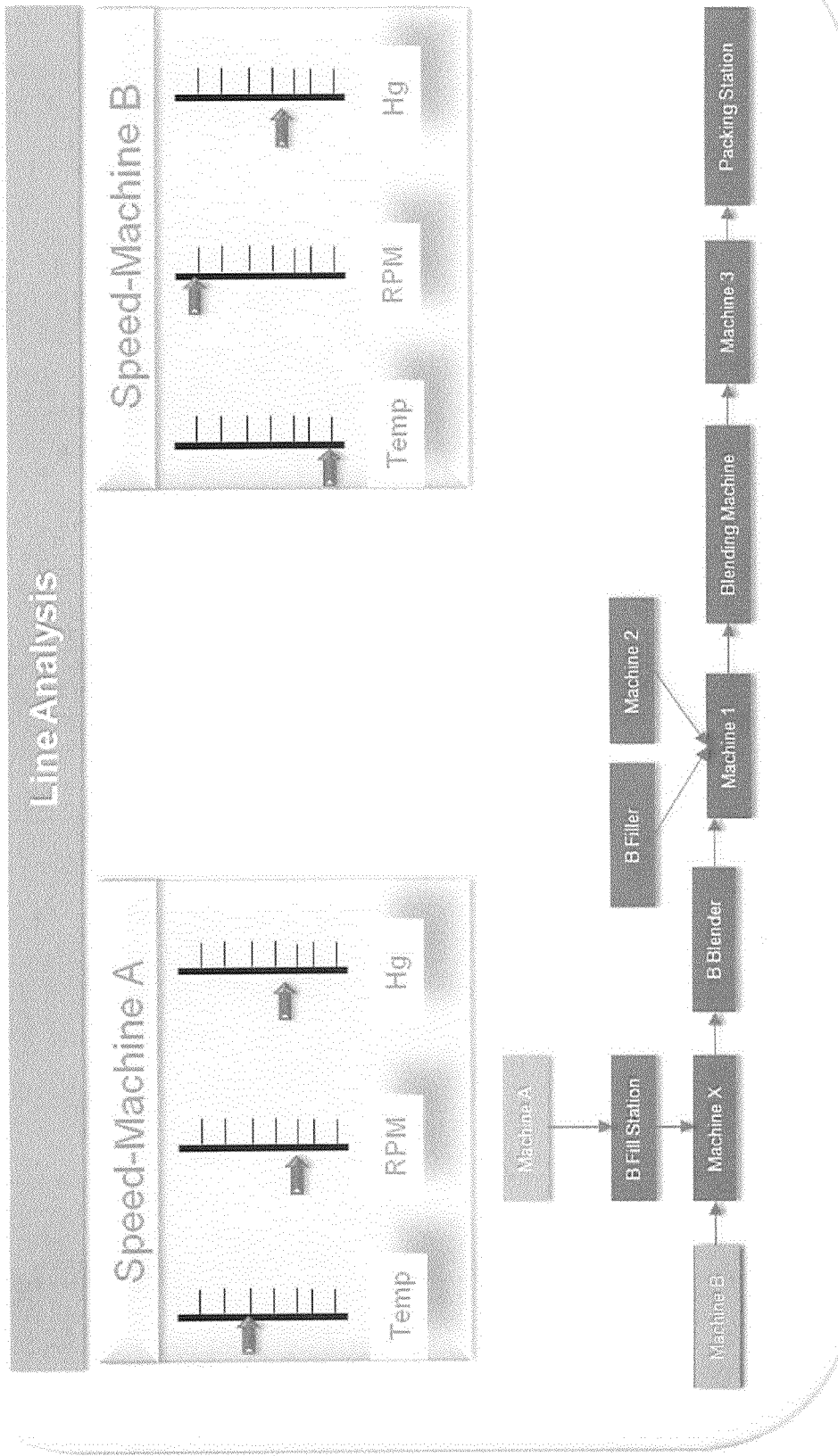
FIG. 5 illustrates a display according to an example embodiment.
Figure 6:
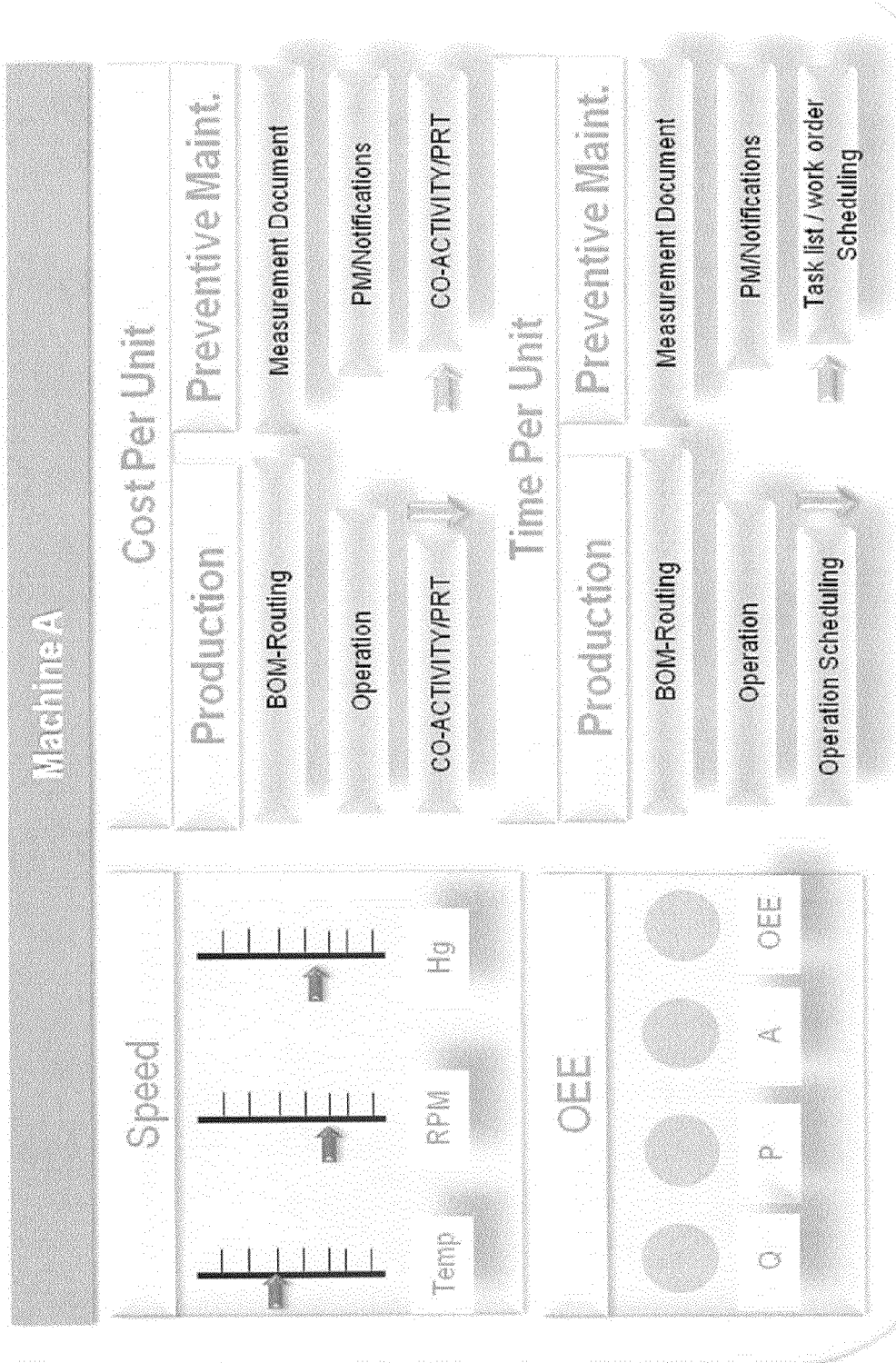
FIG. 6 illustrates a display according to an example embodiment.

FIGS. 5 and 6 illustrate displays according to example embodiments. As shown in FIG. 5 a display for single manufacturing machine (e.g., machine A 240) may display various machine parameter values (e.g., RPM), OEE status (e.g., quality (Q)), cost per unit, and time per unit indications. As shown in FIG. 6, a line analysis display may include indications associated with more than one manufacturing equipment (e.g., machine A 205 and machine B 240) as well as the entire manufacturing process (e.g., manufacturing system 200). Although specific indicators are shown in FIGS. 5 and 6, example embodiments are not limited thereto.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising:

receiving first data from a data warehouse by an in-memory computing module, the first data including performance indicators associated with other equipment in a manufacturing process utilizing an equipment, the in-memory computing module being configured to store the first data in random access memory (RAM) and to process operational and transactional data in real-time;

receiving second data, by the in-memory computing module, from an enterprise resource planning database, the second data including information including at least one of bill of material information, machine set-up information, tool information, and maintenance information associated with the other equipment in the manufacturing process utilizing the equipment;

predicting, by the in-memory computing module, a target time per piece based on the first data and the second data, wherein predicting the target time per piece includes determining the equipment speed over which a time per piece is minimized in order to minimize a time associated with the manufacturing process based on the performance indicators and the information; and setting an equipment speed based on the target time per piece.

2. The method of claim 1, wherein the in-memory computing module is associated with a data warehouse appliance configured to process the operational and transactional data using in-memory analytics and to query data stored in the RAM.

3. The method of claim 1, wherein the first data includes performance indicator associated with other equipment in a manufacturing process utilizing the equipment.

4. The method of claim 1, the second data includes at least one of bill of material information, machine set-up information, tool information, and maintenance information.

5. The method of claim 1, wherein the second data includes at least one of bill of material information, machine set-up information, tool information, and maintenance information associated with other equipment in a manufacturing process utilizing the equipment.

6. The method of claim 1, wherein predicting the target time per piece includes determining the equipment speed over which a time per piece is minimized.

7. A method comprising:

receiving first data from a data warehouse by an in-memory computing module, the first data including performance indicators associated with other equipment in a manufacturing process utilizing an equipment, the in-memory computing module being configured to store the first data in random access memory (RAM) and to process operational and transactional data in real-time;

receiving , by the in-memory computing module, second data from an enterprise resource planning database, the second data including information including at least one of bill of material information, machine set-up information, tool information, and maintenance information associated with the other equipment in the manufacturing process utilizing the equipment;

predicting , by the in-memory computing module, a target cost per piece based on the first data and the second data, wherein predicting the target cost per piece includes predicting a cost such that a cost associated with the manufacturing process in order to minimize the cost associated with the manufacturing process based on the performance indicators and the information; and setting an equipment speed based on the target cost per piece.

8. The method of claim 7, wherein the predicted target cost per piece is a minimum acceptable cost derived from the setting of the equipment speed.

9. The method of claim 7, wherein the in-memory computing module is associated with a data warehouse appliance configured to process the operational and transactional data using in-memory analytics and to query data stored in the RAM.

10. The method of claim 7, wherein the first data includes performance indicators associated with other equipment in a manufacturing process utilizing the equipment.

11. The method of claim 7, the second data includes at least one of bill of material information, machine set-up information, tool information, and maintenance information.

12. The method of claim 7, wherein the second data includes at least one of bill of material information, machine set-up information, tool information, and maintenance information associated with other equipment in a manufacturing process utilizing the equipment.

13. The method of claim 7, wherein predicting the target cost per piece includes determining the equipment speed over which a cost per piece is minimized.

14. A method comprising:

receiving first data from a data warehouse by an in-memory computing module, the first data including performance indicators associated with other equipment in a manufacturing process utilizing an equipment, the in-memory computing module being configured to store the first data in random access memory (RAM) and to process operational and transactional data in real-time;

receiving , by the in-memory computing module, second data from an enterprise resource planning database, the second data including information including at least one of bill of material information, machine set-up information, tool information, and maintenance information associated with the other equipment in the manufacturing process utilizing the equipment;

predicting, by the in-memory computing module, a target time per piece based on the first data and the second data, wherein predicting the target time per piece includes determining the equipment speed over which a time per piece is minimized in order to minimize a time associated with the manufacturing process based on the real-time performance indicators and the real-time information;

predicting , by the in-memory computing module, a target cost per piece based on the first data and the second data, wherein predicting the target cost per piece includes predicting a cost such that a cost associated with the manufacturing process such that the cost associated with the manufacturing process is minimized based on the real-time performance indicators and the real-time information; and setting an equipment speed based on the target time per piece and the target cost per piece.

15. The method of claim 14, wherein the predicted target cost per piece is a minimum acceptable cost derived from the setting of the equipment speed.

16. The method of claim 14, wherein the in-memory computing module is associated with a data warehouse appliance configured to process the operational and transactional data using in-memory analytics and to query data stored in the RAM.

17. The method of claim 14, wherein
- performance indicators include at least one of equipment performance indicators, product quality indicators and equipment availability indicators; and
- the second data includes at least one of bill of material information, machine set-up information, tool information, and maintenance information.

* * * * *